Oct. 28, 1969  J. D. MORLEY  3,475,580
STRIP POSITIONING AND TRIMMING APPARATUS FOR A STRIP
END WELDING MACHINE
Filed May 31, 1966  5 Sheets-Sheet 1

INVENTOR
JOHN D. MORLEY
BY
Wordhams, Blanchard & Flynn
ATTORNEYS

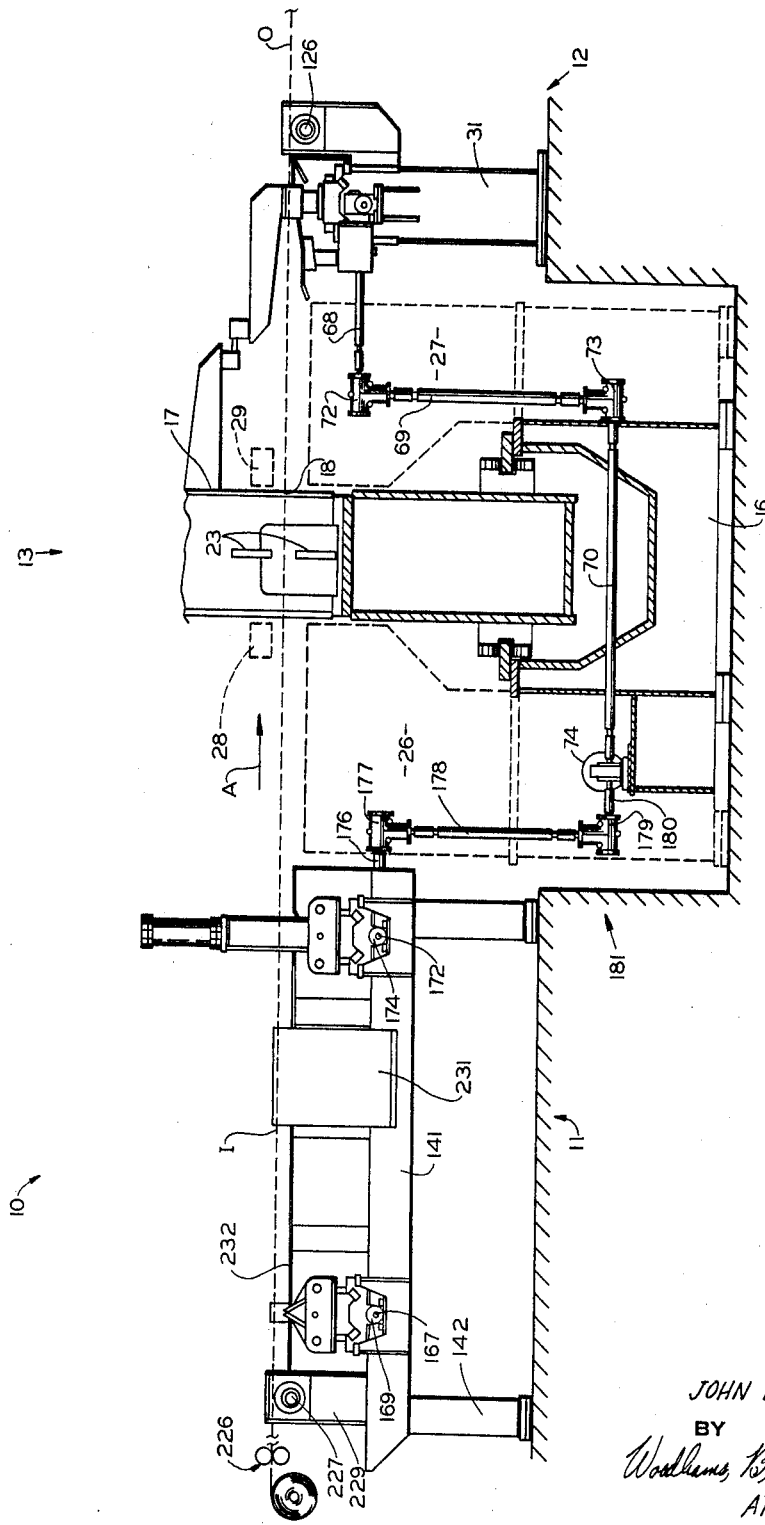

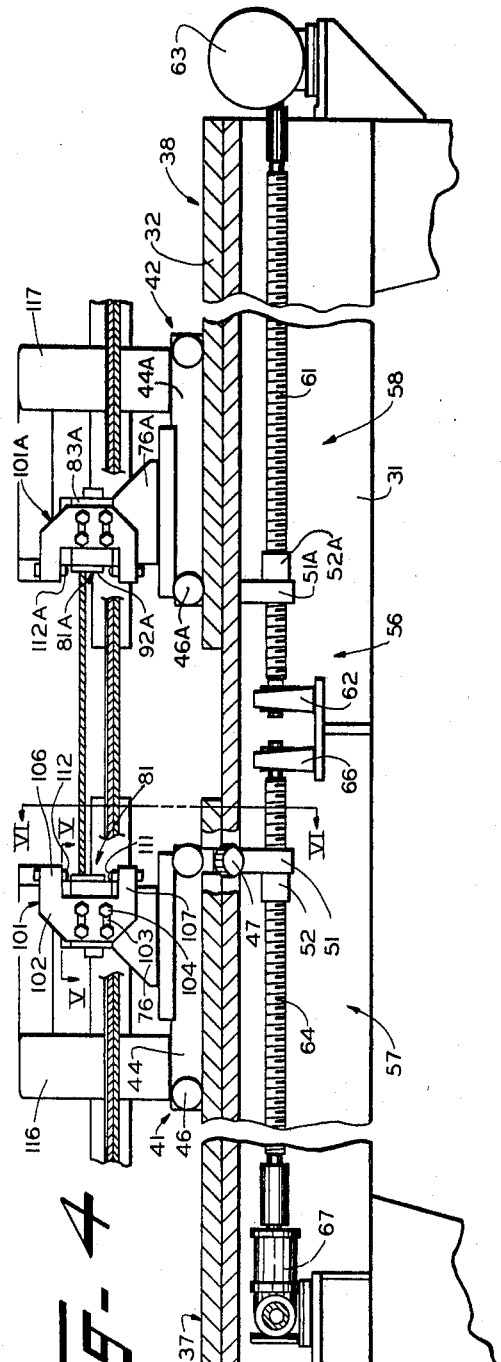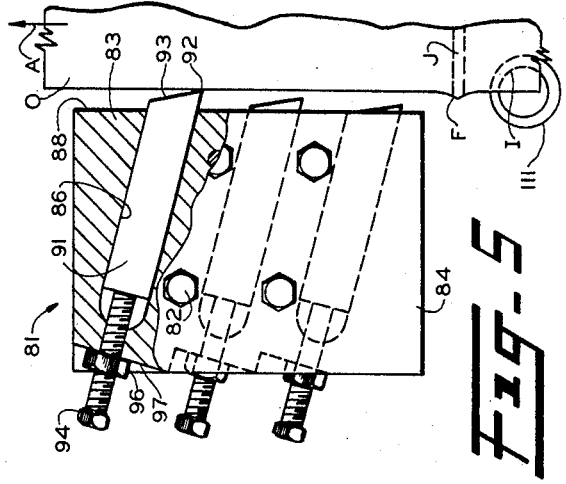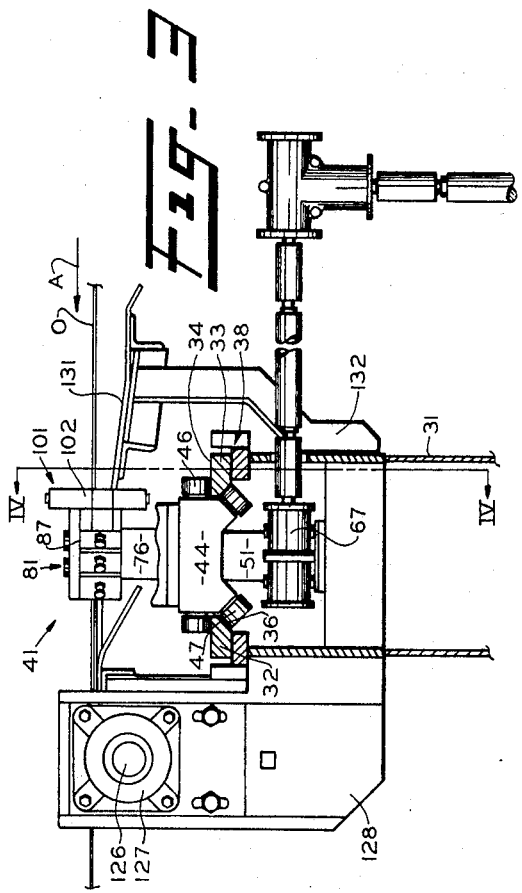

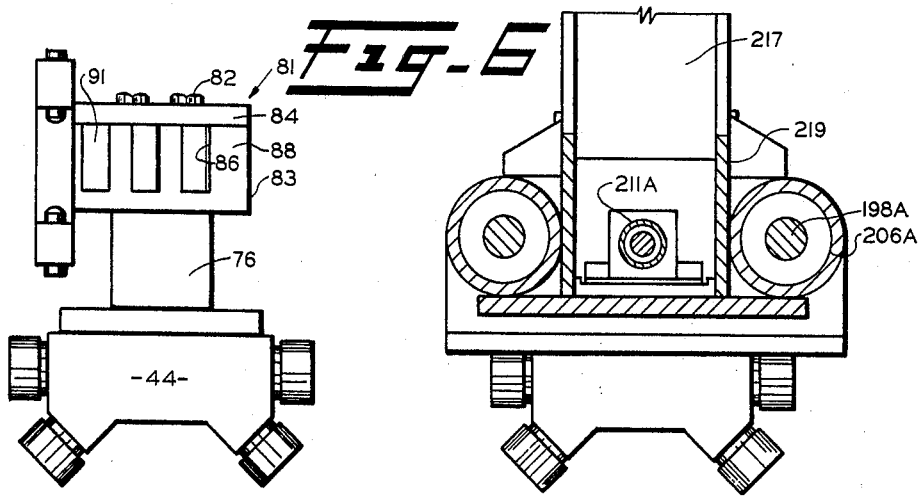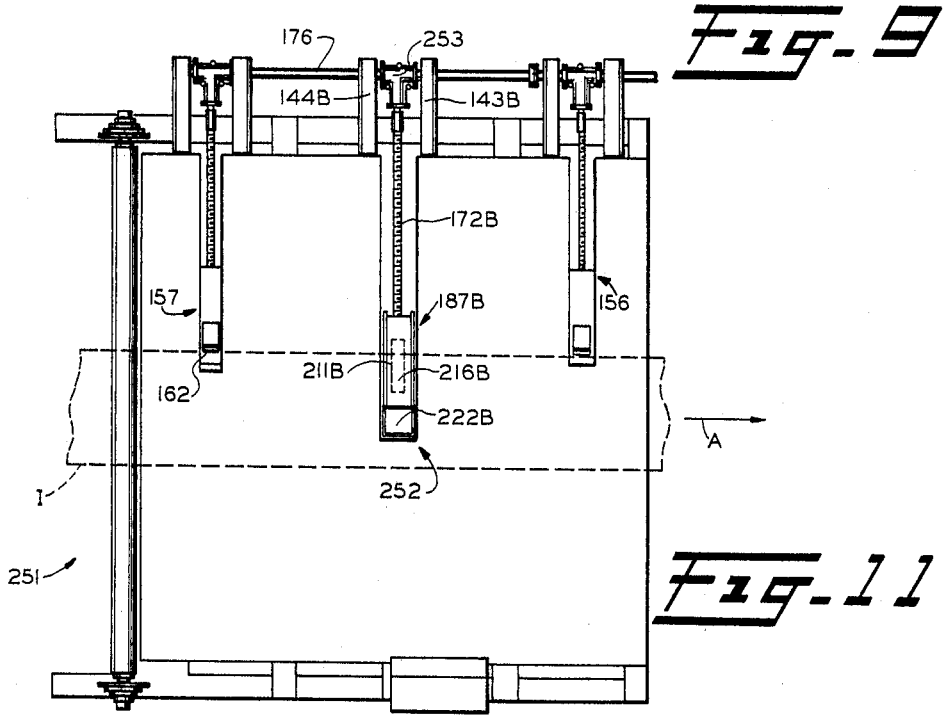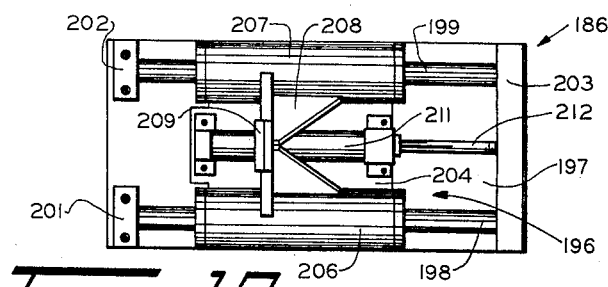

Oct. 28, 1969  J. D. MORLEY  3,475,580
STRIP POSITIONING AND TRIMMING APPARATUS FOR A STRIP
END WELDING MACHINE
Filed May 31, 1966  5 Sheets-Sheet 5
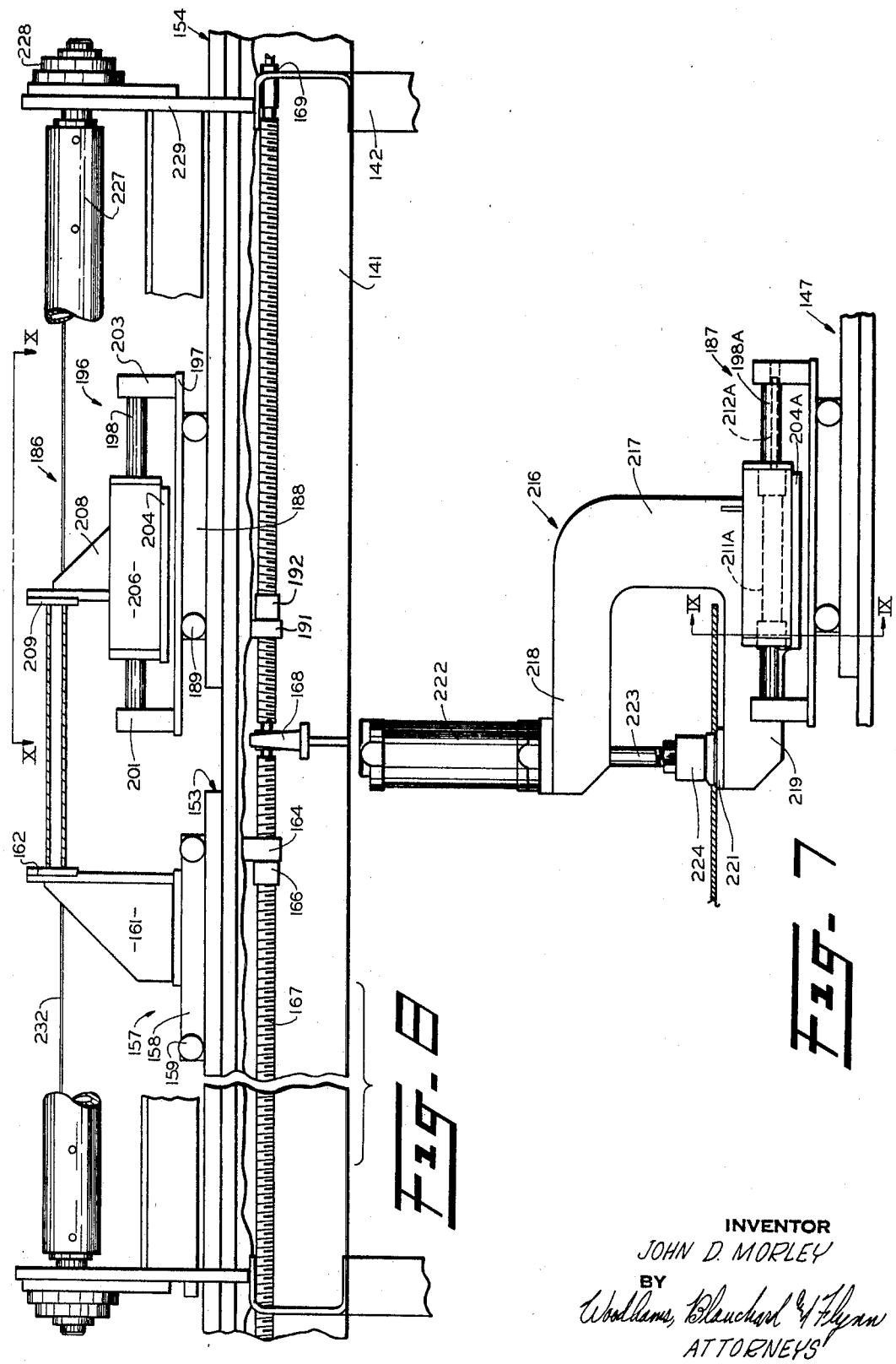
INVENTOR
JOHN D. MORLEY
BY
Woodams, Blanchard & Flynn
ATTORNEYS United States Patent Office 3,475,580
Patented Oct. 28, 1969

3,475,580
STRIP POSITIONING AND TRIMMING APPARATUS FOR A STRIP END WELDING MACHINE
John D. Morley, Bay City, Mich., assignor, by mesne assignments, to Newcor, Inc., Bay City, Mich., a corporation of Delaware
Filed May 31, 1966, Ser. No. 553,970
Int. Cl. B23k 11/06
U.S. Cl. 219—82                                                                17 Claims

ABSTRACT OF THE DISCLOSURE

Apparatus for a strip end welding machine capable of positively and precisely positioning one strip end with respect to another for welding the strip ends together and capable of trimming the welding extrusion from the edges of the joined strips, both the positioning and the trimming being accomplished within a short time interval.

---

This invention relates to a strip positioning and trimming apparatus for a strip end welding machine and more particularly relates to an apparatus capable of positively and percisely positioning one strip end with respect to another for welding together and capable of trimming the welding extrusion from the edges of the joined strips within a short time interval.

Although the apparatus embodying the present invention is capable of use with a wide variety of machines, such apparatus was designed primarily for use with the strip end welding machine of copending application Ser. No. 553,971, filed May 31, 1966, and will be described below in connection therewith for purpose of convenient illustration.

The apparatus embodying the present invention was particularly developed to position strips in a strip end welding machine capable of joining strip ends of substantially greater width (up to about 80 inches in one embodiment) than handled by previous strip end welding machines. The lap welding of such wide strips raise problems not previously encountered. Prior machines capable of satisfactorily lap welding relatively narrow strips are not, insofar as I am aware, capable of handling the problems associated with welding substantially wider strips.

For example, it is common practice in lap welding steel strip ends to make the overlap thereover quite small, ordinarily of the same order of magnitude as the thickness thereof. The object of a small overlap is to minimize the amount by which the thickness of the weld joint exceeds the nomral strip thickness so that the joint can be readily reduced approximately to the normal strip thickness by a simple planishing operation. On the other hand, if the overlap is too small, the pressure of the welding electrodes might unlap the ends to be joined and cause a defective joint.

Thus, it is an object of this invention to provide a strip positioning and scarfing appartus for a strip end welding machine.

A further object of the invention is to provide an apparatus, as aforesaid, which will precisely axially align and transversely register corresponding edges of a pair of strip ends to be joined, which will positively prevent cocking of one of the strips with respect to the other thereof and transverse offsetting of the strip ends and which will remove irregularities including weld joint flash from the edges of a strip moving therepast to insure that such strip edges will be continuously smooth, parallel and precisely spaced.

A further object of the invention is to provide an apparatus, as aforesaid, in which the tail of the existing strip is not shifted transversely or centered prior to clamping in the welding machine, in which the head end of the entering strip is moved transversely to a position in which one edge thereof is aligned with the corresponding edge of the exiting strip and in which the one edge is positively mechanically limited from further transverse motion past said position.

A further object of the invention is to provide an apparatus, as aforesaid, in which the limit of transverse shifting of the head end and the positioning of the scarfing means for at least one edge of the joined strip is accomplished simultaneously with and depends upon the sensing of the position of at least one of the edges of the tail end and in which the positioning of the one edge of the head end is accomplished through a simple but positive mechanical connection to the means detecting the position of the tail.

A further object of the invention is to provide an apparatus, as aforesaid, which can be used with a variety of strip end welders and particularly those capable of handling relatively wide strips and which is particularly adapted ot cooperative use with the strip end welder of the aforesaid copending application Ser. No. 553,971.

A further object of the invention is to provide an apparatus, as aforesaid, which can position nad scarf strips of substantial width and of widely varying width, thickness and material type and which is readily adaptable to automatic or manual operation.

A further object of the invention is to provide an apparatus, as aforesaid, which does not require excessively tight manufacturing tolerances, which in capable of economical manufacture, capable of long and highly reliable use under unfavorable conditions with little or no maintenance and is readily maintainable.

A further object of this invention is to provide an apparatus, as aforesaid, which is capable of operating quickly and accurately and which will quickly and positively release the welded strip upon proper actuation to eliminate all possibility of binding of the welded strip thereby as it moves through the apparatus after scarfing.

Other objects of this invention will be apparent to persons acquainted with apparatus of this general type upon reading the following description and inspecting the accompanying drawings.

In the drawings:

FIGURE 2 is a fragmentary sectional view substantially as taken on the line II—II of FIGURE 1.

FIGURE 3 is an enlarged, fragmentary sectional view substantially as taken on the line III—III of FIGURE 1.

FIGURE 4 is a sectional view substantially as taken on the line IV—IV of FIGURE 3.

FIGURE 5 is an enlarged fragmentary partially broken sectional view taken on the line V—V of FIGURE 4.

FIGURE 6 is an enlarged, fragmentary sectional view substantially as taken on the line VI—VI of FIGURE 4.

FIGURE 7 is an enlarged, fragmentary sectional view substantially taken on the line VII—VII of FIGURE 1.

FIGURE 8 is a fragmentary, partially broken and enlarged sectional view substantially as taken on the line VIII—VIII of FIGURE 1.

FIGURE 9 is a sectional view substantially taken on the line IX—IX of FIGURE 7.

FIGURE 10 is a sectional view substantially as taken on the line X—X of FIGURE 8.

FIGURE 11 is a fragment of FIGURE 1 showing a modification.

Figure 1:
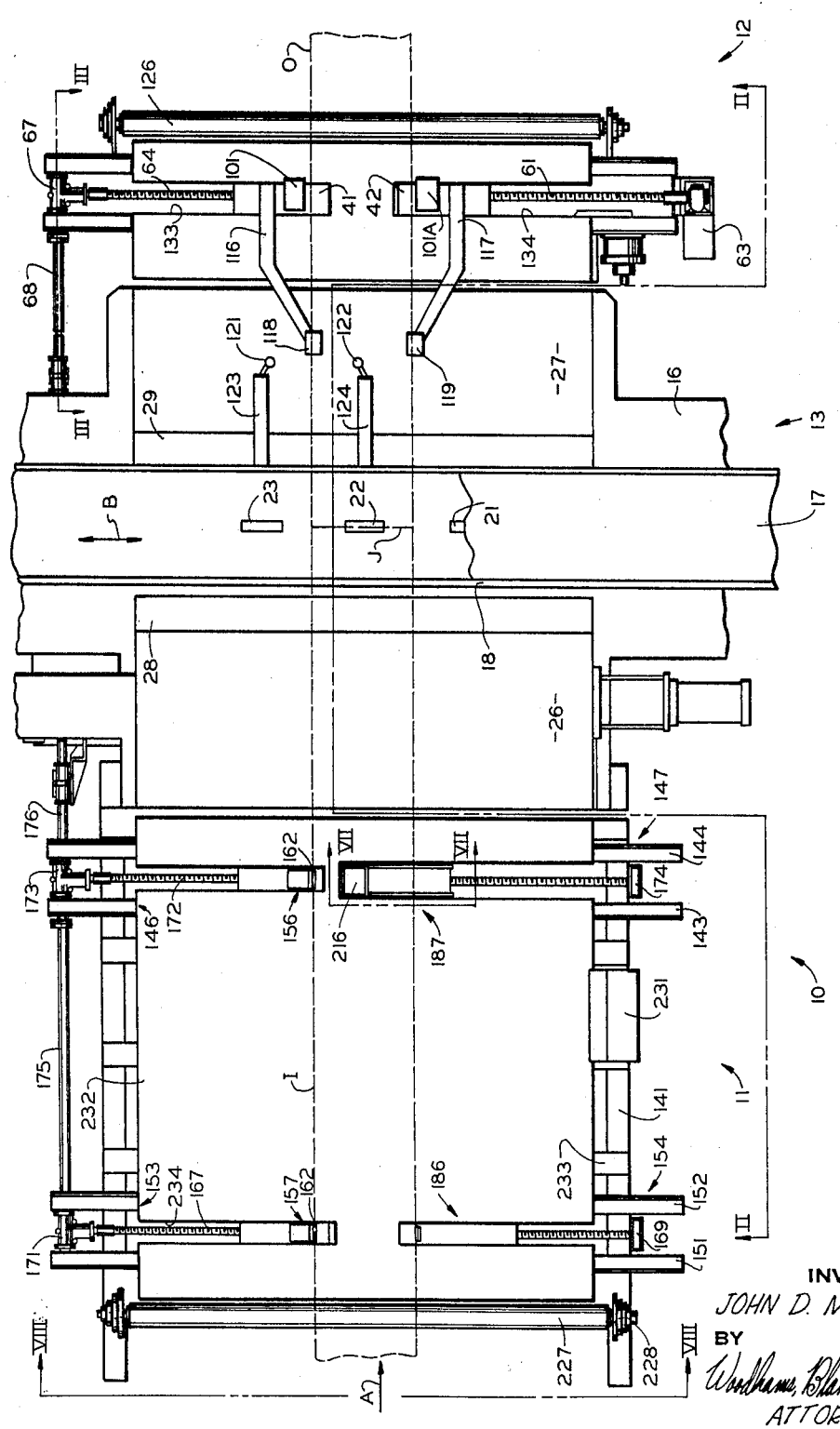
FIGURE 1 is a fragmentary, partially broken top elevational view of scarfing and positioning apparatus embodying the invention arranged in a position of use with a strip end welding machine.

Certain terminology will be used in the following description for convenience in reference only and will not be limiting. The words "upwardly," "downwardly," "rightwardly" and "leftwardly" will designate directions in the drawings to which reference is made. The words "forwardly" and "rearwardly" will refer to the directions of strip flow through the machine, forwardly being the normal flow direction and rearwardly being the opposite direction, the normal flow direction being toward the right as seen in FIGURE 1 and indicated by the arrow A. The terms "entry" and "exit" will be applied to portions or parts of the apparatus which a forwardly travelling strip will meet first and last, respectively. Further, the terms "tail end" or just "tail" will refer to the end of the outgoing strip, that is, the strip on the exit side of the equipment. The term "head end" or simply "head" will refer to the approaching end of the incoming strip, that is, the strip entering the machine from the entry side thereof. The terms "drive side" and "operator side" will refer to the left and right sides of apparatus, respectively, as seen in FIGURE 4. The words "inwardly" and "outwardly" will refer to the geometric center of the apparatus and parts thereof. Said terminology will include the words above specifically mentioned, derivatives thereof and similar words of import.

GENERAL DESCRIPTION

In general, the objects and purposes of this invention are met by providing a positioning and trimming apparatus for a strip end welding machine including means on the exit side of the machine for gauging the location of the tail end of the exiting strip. Scarfing means are carried by the exit means for shearing irregularities from the edges of the strips as the strips pass thereby. Alignment means are provided on the entry side of the machine and are responsive to the positioning of at least one of the exit means to limit transverse movement, at least in one direction, of the strip entering the machine. Positioning means are provided on the entry side of the machine which are actuable for moving the entering strip transversely against the alignment means and for gripping the incoming strip after it has entered the apparatus to prevent undesired axial movement thereof.

DETAILED DESCRIPTION

The apparatus embodying the invention comprises coaxially aligned entry and exit equipments 11 and 12 which are located closely adjacent to and on the leftward and rightward sides, respectively, of a strip end welding machine generally indicated at 13. Although the apparatus 10 embodying the present invention could be used with a wide variety of strip joining machines, the particular machine 13 shown for purposes of illustration is that of the aforesaid copending application Ser. No. 553,971 Briefly, the machine 13 includes a fixed base 16 which extends transversely of and lies between the entry equipment 11 and exit equipment 12 of the apparatus 10. The machine base 16 supports an upstanding O-frame 17 which is horizontally reciprocable therealong, the direction of motion thereof being indicated by the arrow B in FIGURE 1. The O-frame 17 is provided with an elongated opening 18 therethrough through which an incoming strip I and an outgoing strip O indicated in broken lines in FIGURES 1 and 2 may pass rightwardly as indicated by the arrow A. A shear 21, a pair of planishing rolls 22 and a pair of welding rolls 23 are, as disclosed in greater detail in the afore-mentioned copending application, arranged longitudinally in and along the opening 18 of the O-frame 17 for reciprocation therewith transversely of the incoming strip I and the outgoing strip O preferably axially aligned therewith for trimming, welding and planishing the ends thereof to produce a welded joint. The machine base 16, as indicated in broken lines in FIGURE 2, carries entry and exit supports 26 and 27 located on the leftward and rightward sides respectively of the O-frame 17 for supporting entry and exit clamps 28 and 29, respectively. The entry clamp 28 is actuable for clamping the head end of the incoming strip I to the support 26 and the exit clamp 29 is actuable for clamping the tail end of the outgoing strip O to the support 27 whereby to hold said ends in position for trimming, welding and planishing.

Turning now to the apparatus 10 (FIGURES 1, 2, 3 and 4) embodying the present invention and more particularly to the exit equipment 12 thereof, same includes an upstanding base 31 which extends transversely across and below the path of the outgoing strip O and in parallel, spaced relation to the machine base 16. The exit base 31 is preferably hollow at its upper end for reasons appearing hereinafter. The upper end of the base carries a spaced, horizontal pair of ways 32 and 33 which extend longitudinally of the base and, hence, are perpendicular to the path of the outgoing strip O and lie therebeneath. The ways 32 and 33 have horizontal upper surfaces 34. The lower opposed corners of the ways 32 and 33 are beveled as indicated at 36 to form downwardly and outwardly sloped surfaces. In the particular embodiment shown, the ways are broken in the middle of the base 31 into two segments each and comprise an operator side pair of segments 37 and a drive side pair of segments 38 (located at the left and the right, respectively in FIGURE 4).

Opposed carriages 41 and 42 are carried on the way pairs of segments 37 and 38, respectively. The carriages 41 and 42 are preferably mirror images of each other and, hence, the following discussion of the carriage 41 will also apply to the carriage 42. Further, parts of the carriage 42 corresponding to parts of the carriage 41 will be referred to hereinafter by the same reference numerals thereas with the suffix "A" added thereto.

The carriage 41 includes an elongated body 44 disposed between the ways 32 and 33 of the pair 38. Rollers 46 are rotatably affixed to both sides of the body 44 at longitudinally spaced locations thereon. The body 44 is supported for reciprocation along the ways 32 and 33 by said rollers which roll upon the upper surfaces 34 of the ways 32 and 33. The carriage body 44 carries further angled rollers 47 beneath the rollers 46 which bear snugly on the beveled surfaces 36 for preventing vertical and sideways motion of the carriage 44 with respect to the ways 32 and 33. The inner ends of the carriage bodies 44 are provided with depending tongues 51 which extend downwardly between the ways 32 and 33. Tongue 51 has an internally threaded colar 52 affixed thereto in registry with an opening, not shown, therethrough.

The exit equipment 12 is provided with a drive system 56 by means of which the carriages 41 and 42 may be moved along the ways toward and away from each other. The drive system 56 is a positive one capable of moving the carriages inwardly to precisely defined points. In the preferred embodiment shown, the drive system 56 includes separate portions 57 and 58 (FIGURE 4) for moving the carriage 41 and 42, respectively.

The drive system portion 58 comprises an elongated screw 61 centered beneath the carriage 42 and extending longitudinally of the way pair 38. The screw 61 threadably engages and extends through the collar 52A and the tongue 51A and threadedly engages the former. The inner end of the screw 61 is supported on a bearing 62 fixed with respect to the base 31 and the outer end of the screw 61 is rotatably supported and energized by a motor 63, preferably an electric motor, supported on the base 31.

The drive system portion 57 is similarly provided with an elongated screw 64 coaxial with the screw 61 and which extends threadedly through the collar 52 and the depending tongue 51, the inner end of the screw 64 being supported in a bearing 66 near the center of the base 31 and the outer end thereof being supported and driven by a right angle drive device 67 mounted on the base 31. The drive device 67 is of any conventional, positively driving type such as a bevel gear type drive device.

The drive system portion 58 further includes drive shafts 68, 69 and 70 (FIGURES 1 and 2) serially connected from the right angle drive 67 through further positive right angle drives 72 and 73 preferably identical to the drive 67 to a motor 74, preferably electric, here mounted on the machine base 16. Thus, the portions 57 and 58 of the drive system 56 are completely positive and, as a result, the location of the carriages 41 and 42 when current to the motors 63 and 74 is cut off will be predictably related with a high degree of precision to the point at which the carriages stop.

Returning to the carriages 41 and 42, the same carry upstanding pedestals 76 and 76A (FIGURES 3, 4 and 6), respectively, which are fixed to the upper surface of the bodies 44 and 44A, respectively, adjacent the inner ends thereof. Scarfing devices 81 and 81A (FIGURES 3, 4, 5 and 6) are fixed atop the pedestals 76 and 76A, respectively. The scarfing device 81 comprises a generally rectangular block 83 (FIGURE 5) surmounted by a cover plate 84 affixed thereto by screws 82. A plurality, here three, of upwardly opening, generally rectangular grooves 86 are cut in the upper face 87 of the block 83 and are of substantial depth. The grooves 86 open through the inner wall 88 of the block 83 at locations spaced along the length of the adjacent strip O. The open, inner ends of the grooves 86 are displaced angularly toward the machine 13 with respect to the closed, outer ends thereof. Thus, the grooves 86 lie at a relatively large acute angle to the direction A of strip movement, here about 75 degrees.

The grooves 86 snugly but slideably house preferably identical blades 91. The blades 91 extend at least to the tops of the grooves 86 and are fixed in place by the cover 84 when the screws 82 are tightened. The vertical edge 92 closest to the machine 13 on each blade 91 comprises a cutting edge past the midportion of which the strip moves. The inner end wall of each blade 91 tapers away fromt he strip O behind the cutting edge 92 as indicated at 93. An adjusting screw 94 is threaded longitudinally into the outer end of each of the grooves 86 for bearing on the opposed end of the corresponding blade 91 and is alternatively adjustable for urging the blade toward the strip O and for allowing retraction of the blade. Lock nuts 96 are provided in a conventional manner on the screws 94 to prevent unintended repositioning thereof. The outer face 97 of the block 83 preferably includes stepped surfaces perpendicular to the screws 94 against which the lock nuts 96 may bear. The screws 94 are preferably adjusted so that the blades 91 extend progressively nearer the strip O in the direction A of strip travel, the blade 91 furtherest from he machine 13 only very narrowly clearing the edge of the outgoing strip O. Thus, any irregularity extending transversely from the edge of the outgoing strip O first encounters the lowermost (FIGURE 5) blade 91 which removes a portion of the irregularity. The irregularity then contacts the middle blade which shaves off a further portion and finally meets the last blade which will shave off the last of the irregularity leaving a smooth, unbroken edge. The scarfing device 81A is opposite to and preferably a mirror image of the device 81 and so requires no further description.

The carriage 41 and 42 further include strip edge sensing means generally indicated at 101 and 101A and which are preferably mirror images of each other, a description of sensor 101 sufficing for both. In the particular embodiment shown, the sensor 101 is affixed to the side of the block 83 closest to the machine 13. The sensor 101 comprises a generally C-shaped bracket 102 having an upstanding bight portion provided with horizontally elongated slots 103 through which are inserted screws 104 for holding the bracket to the block 83. The slots 103 allow adjustment of the bracket 102 toward and away from the strip O. The bracket 102 has upper and lower arms 106 and 107 which extend horizontally from the bight to positions above and below respectively, the edge of the adjacent strip O. One of the arms 106 and 107 carries a suitable radiation source 111. The other arm carries a radiation detector of corresponding type in vertically aligned, coaxial relationship with the source 111. Although use of a wide variety of energy sources and detectors is contemplated within the broader aspects of the invention, the present embodiment includes a lamp as the source 111 and photosensitive means such as a photocell as the detector 112. The photocell is preferably mounted in the upper arm 106 to minimize spurious actuation thereof by overhead environmental lights and thus, the lamp 111 is preferably mounted in the lower arm 107. The source 111 and detector 112 are positioned so that the detector becomes de-energized as the edge of the strip O approaches the innermost blade edge 92. The output of the detectors 112 and 112A are fed to any conventional control means, not shown, to control the actuation of the motors 74 and 63. Thus, the motors 63 and 74 may be energized to move the carriages 42 and 41 toward the outgoing strip O, such motion continuing until the beams of radiation to the detectors 112 and 112A are broken by the corresponding edges of the strip O whereat the change in detector output individually shuts off the motors 63 and 74. Proper transverse adjustment of the positions of the brackets 101 and 101A assures that the motors 63 and 74 will stop and, hence, that the inward progress of the carriages 41 and 42 will stop as the innermost ones of the blades 92 and 92A assume their predetermined clearance position adjacent the edges of strip O.

In the particular embodiment shown, the carriages 41 and 42 carry arms 16 and 117, respectively (FIGURES 1 and 2, which extend upwardly therefrom and then rearwardly toward the O-frame 17. The free ends of the arms 116 and 117 are preferably angled inwardly somewhat and carry actuator blocks 118 and 119, respectively, which are disposed in a predetermined position with respect to the strip O when the carriages have moved to their innermost positions adjacent such strip O. In the particular embodiment shown, the blocks 118 and 119 when so positioned are centered above corresponding edges of the strip O. Limit switches 121 and 122 are supported by forwardly extending brackets 123 and 124, respectively, on the forward face of the O-frame 17 above the exit clamp 29 for actuation by the actuator blocks 118 and 119 as the O-frame moves therepast. The brackets 123 and 124 are preferably substantially centered upon the axes of the welding and planishing rolls 23 and 22, respectively, so that the switch 121 will be actuated by the blocks 118 and 119 as the welding rolls start across and move off the joint J of strip I and O and so that switch 122 will be actuated as the planishing rolls pass the strip edges. In the particular embodiment shown, the switch 121 is preferably arranged by any convenient means, not shown, to control the vertical work-engaging movement of the weld rolls 23 as well as welding current flow thereto and the switch 122 is preferably similarly arranged to control engagement of the work by the planishing rolls 22. Since the carriages 41 and 42 are positioned by the edge sensors 101 and 102 precisely at the edges of the outgoing stirp O, the positions of the actuation blocks 118 and 119 will precisely reflect the width and transverse location of the strip O so that actuation thereby of the switches 121 and 122 will, though conventional circuitry, not shown, cause clamping and release of the weld and planishing rolls precisely on the edges of the strips as the O-frame 17 moves back and forth thereacross. This eliminates any tendency for the weld or planishing rolls to come together before or after the edges of the strips have been passed or to separate before the end of the joint is reached, any one of which would result in an unacceptable weld joint. Alternatively if desired, actuation of the switches 121 and 122 when the rolls 23 and 22 approach the weld joint may be arranged to stop the O-frame while the rolls are brought together precisely at the edge of the strips, the O-frame thereafter resuming its travel.

A transverse horizontal roll 126 (FIGURES 1 and 3) is rotatably supported on bearings 127 carried by suitable framework 128 on the base 31. The roll 126 supports the outgoing strip O as it goes from the exit equipment 12. An exit table 131 is supported on suitable framework 132 affixed to the base 131. The table 131 extends transversely of the exit equipment 12 for substantially the width of the widest strip to be handled by the machine 13 and extends longitudinally of the strip between the roll 126 and the exit clamp support 27. The table 131 is sloped to provide a smooth transition between the top of the support 27 and the top of the roll 126 which is slightly thereabove, the table 131 lying somewhat below the intended path of the outgoing strip O but above the pedestal 76. The table 131 has notches 133 and 134 which extend inwardly from the ends thereof above the way pairs 37 and 38 to points adjacent the middle of the table for allowing free reciprocation of the carriages 41 and 42 therealong.

The entry equipment 11 has a base 141 (FIGURES 1, 2 and 8) which is elongated in the direction of strip travel and is supported upon suitable legs 142. In the particular embodiment shown, forward ways 143 and 144 extend transversely across the base 141 at the rightward (FIGURES 1 and 2) end thereof which are preferably identical to the exit ways 32 and 33 above described and are preferably broken in the middle to form a drive side set 146 and an operator side set 147. Further ways 151 and 152 extend transversely across the base 141 adjacent the leftward end thereof. The further ways 151 and 152 are also preferably identical to the above-described exit ways 32 and 33 in being broken at the middle thereof to form a drive side set of ways 153 and an operator side set of ways 154.

Preferably identical alignment carriages 156 and 157 are supported for reciprocation along the drive side way sets 146 and 153, respectively, the following description of the carriage 157 also applying the carriage 156. The alignment carriage 157 (FIGURES 1 and 8) has a body 158 carrying a plurality of rollers 159 for constraining same to reciprocation along way set 153, as in the exit carriages 41 and 42 above described.

Alignment carriage 157 carries an upstanding pedestal 161 to the upper end of which is fixed a vertical abutment plate 162. The abutment plate 162 faces the strip I, the intermediate portion of the plate 162 directly opposing such strip to prevent transverse movement of the strip I therepast. The inner end of the carriage body 158 has a depending, centrally located tongue 164 affixed thereto. The lower end of the tongue is perforated axially of the ways by a hole, not shown, and carries an internally threaded collar 166 affixed thereto coaxially of such hole as in the above described exit carriages.

A screw 167 threadedly engages and extends through the collar 166 of the carriage 157 in parallelism with and between the ways 151 and 152. The screw 167 is supported midway between the ends of the ways by a bearing 168 and at the operator end of the ways by a further bearing 169. The drive side end of the screw 167 is rotatably supported by and driven by a positive right angle drive device 171. Thus, rotation of the screw 167 will thread the collar 166 therealong and move the alignment carriage 157 therealong in a direction corresponding to the direction of rotation of the screw 167. A preferably identical screw 172 is disposed between the ways 143 and 144 for driving the forward alignment carriage 156 as the above-described screw 167 drives the alignment carriage 157. As seen in FIGURE 1, the drive end of the screw 172 is supported and driven by a right angle drive device 173 while the operator end thereof is supported on a suitable bearing 174. The midportion of the screw 172 is preferably supported by a bearing, not shown, corresponding to bearing 168 of the screw 167. The threads on the operator side halves of the screw 167 and 172 are opposite in hand to the threads on the drive ends thereof.

The right angle drives 171 and 173 are positively connected by a shaft 175 and the right angle drive 173 in turn connects through a shaft 176, right angle drive device 177 (FIGURE 2), further shaft 178, further right angle drive 179 and stub shaft 180 to the output of the motor 74 to form an alignment drive system 181. Thus, the drive system 181 positively connects the motor 74 to the screws 167 and 172 to cause reciprocation of the alignment carriages 156 and 157 at the same rate of speed and coincidentially with the reciprocation of the drive side exit carriage 41. Further, the alignment carriages 156 and 157 are positioned on their screws 172 and 167 in fixed relationship to the positioning of the exit carriage 41 on its screw 64 so that the strip contacting face of the abutment blocks 162 on the carriages 156 and 157 will be at all times precisely axially aligned with the cutting edge 92 of the inwardmost extending one of the scarfing blades 91 on the exit carriage 41. Thus, with the drive side edge of the incoming strip I located against the abutment blocks 162 and the drive side edge of the outgoing strip O located against the inwardmost one of the scarfing knives 91, longitudinal alignment of the drive side edges of the incoming and outgoing strips is assured. In the preferred embodiment shown, the right angle drive preferably all beveled gear drives having a 1-1 ratio, the screws 167, 172 and 64 have identical threads and the shafts 181 and 70 are driven at the same speed by the motor 74 thus assuring identical rates of travel for the entry alignment carriages 156 and 157 and the exit carriage 41.

In the particular embodiment shown, the incoming strip I is urged transversely against the abutment plates 162 of the alignment carriages 156 and 157 by positioning or pusher carriages 186 and 187 mounted for reciprocation upon the ways 151, 152 and 142, 143, respectively, at the operator ends thereof in opposed relationship to the alignment carriages 157 and 156, respectively. The leftward (FIGURES 1 and 2) pusher carriage 186 has a body 188 (FIGURES 8 and 10) and rollers 189 for supporting said body for reciprocation along the ways 151 and 152, said body and rollers being preferably identical to corresponding parts of the exit carriage 41, above described. The inner end of the body 188 is provided with a depending tongue 191 having a collar 192 mounted thereon in threaded engagement therewith the reverse threaded operator end of the screw 167 for reciprocating the carriage 186 as a function of rotation of said screw. Thus, as the screw 167 rotates, the carriages 157 and 186 will move toward or away from each other.

A traversing structure 196 is mounted atop the body 188 (FIGURE 8) of the carriage 186. The traversing construction comprises a bed plate 197 affixed to the top of the body 188 and axially overlapping same. Parallel and horizontally spaced rods 198 and 199 extend along and above the ways 151 and 152, respectively, and are fixed above the bed plate 197 by upstanding buttresses 201, 202 and 203 located at the ends of the bed plate. A platform 204 is suspended from the rods 198 and 199 for axial movement therealong by axial slide bearings 206 and 207. An upstanding pedestal 208 is affixed atop the platform 204 between the axial bearings 206 and 207. The pedestal 208 carries an abutment plate 209 which in the particular embodiment shown is identical to the abutment plate 162 above described and faces toward the edge of the incoming strip I. A pressure fluid cylinder 211 is supported on the platform 204 with the piston rod 212 thereof fixed to the buttress 203. The pressure fluid cylinder 211 is energized by any convenient means, not shown, to move the abutment plate 209 against the opposed edge of the strip I, to move the strip I transversely into contact with the opposed abutment plates 162 of the alignment carriages 156 and 157 and to retract the abutment plate 209 away from the strip I.

The pusher carriage 187 (FIGURE 7) is preferably identical to the pusher carriage 186 above described except that pedestal 208 and abutment plate 209 of the latter are replaced with a clamp generally indicated at 216.

Thus, parts of the carriage 187 similar to parts of the carriage 186 will be referred to by the same reference numeral thereas with the suffix "A" added thereto. The clamp 216 is supported on the platform 204A and comprises an upstanding, generally C-shaped member 217 having vertically spaced arms 218 and 219 extending toward the strip I and adapted for passing respectively over and under the adjacent edge of said strip. The lower arms supports a plate-like anvil 221 at its free end and the upper arm 218 carries at its free end an upstanding pressure fluid cylinder 222 having a piston rod 223 which extends downwardly through the arm 218 and carries a block 224 on the lower end thereof which overlies the anvil 221. Thus, pressure fluid cylinder 222 may be actuated to clamp the incoming strip I between the block 224 and anvil 221 for preventing longitudinal movement of the strip away from the machine 13 upon release of the means normally advancing the strip I longitudinally here, for example, pinch rolls 226 (FIGURE 2).

The entry base 141 carries at its leftward end (FIGURES 1 and 2) an elongated, horizontal and transversely extending roll 227 supported for rotation at its ends by bearings 228 carried by upstanding brackets 229 mounted on the base 141. The operation of the apparatus 10 and machine 13 is preferably controlled and synchronized by a suitable control panel 231 mounted on the entry base 141. A table 232 is supported on the base 141 by framework 233 just below the strip I. The table 232 is generally horizontal and extends along the strip from the roll 227 to the entry clamp support 26 and transversely of the strip substantially to the edges of the framework 141. The table 232 is spaced above the ways 151, 152 and 142, 143 and is provided with elongated transverse notches 234 upwardly through which the upper portions of the carriages 156, 157, 186 and 187 protrude to allow such carriages to be moved toward and away from the strip I.

OPERATION

In the rest position of the machine 13, the clamps 28 and 29 are open and the O-frame 17 is normally positioned at one end of its travel (the drive or upper end as seen in FIGURE 1) with the shear 21 open over the strip passing through the machine and with the rolls 22 and 23 open, the passage of a strip therethrough thus being unimpeded by the machine 13 in its rest state. Similarly, when the apparatus 10 is in its normal rest state, the carriages are all moved away from the passing strip and the clamp 216 is open so that the strip is free to move through the apparatus 10.

The strip O exiting from the machine 13 and hence from the exit equipment 12 may be handled by conventional succeeding apparatus, not shown, so that as the tail end of the outgoing strip O moves over the entry equipment and approaches the O-frame, it may be stopped momentarily to allow the head end of a new strip I to be welded thereto. Thus, as the tail end of the outgoing strip O moves into the O-frame 17, the exit clamp 29 is closed to hold the tail fixed with respect to the machine 13 so that the shear 21 can trim the tail end of the proper length. Thereafter, the head end of a new incoming strip I is led past the entry alignment carriages, under the entry clamp 28 and into the O-frame 17.

With the tail end so fixed, the motors 74 and 63 are energized, as through control 231, and through the drive system portions 57 and 58 (FIGURE 3) rotate the screws 61 and 64 for moving the exit carriages 41 and 42 inwardly toward the adjacent edges of the outgoing strip O. As the exit carriages approach, not necessarily simultaneously, the edges of the outgoing strip O, the light beams falling on the detectors 112 and 112A are broken which changes the individual output, thereof such changes causing the motors 74 and 63, respectively, to be shut off. When the motors 74 and 63 shut off, the respective carriages 41 and 42 stop so that the innermost extending one of the blades 91 in the scarfing devices 81 and 81A lie closely adjacent the edges of the strip O. The carriages 41 and 42 move independently of each other, the actuation thereof depending strictly upon the position of the adjacent strip edges. Thus, it is not necessary for the strip O to be centered or consistently placed with respect to the centerline of the exit apparatus 12 for its position to be satisfactorily detected by the exit carriages 41 and 42. Normally, however, the outgoing strip O will parallel the centerline of the apparatus 10.

With the carriages 41 and 42 thus located at the edges of the outgoing strip O, the blocks 118 and 119 carried on the arms 116 and 117 thereof will be positioned to later trip the limit switches 121 and 122 at the proper point for urging the welding and planishing rolls 23 and 22 against the joint J.

As the motor 74 drives the drive system portion 57 to adjust the position of the carriage 41 as above discussed, it also causes the drive system 181 to move the entry alignment carriages 156 and 157 inwardly toward the incoming strip I and stop same when the inner faces of the abutment plates 162 thereon are precisely aligned longitudinally of the apparatus 10 with the drive side edge of the outgoing strip O, the alignment carriages transversely displacing the strip I, if necessary, to reach their required positions. The pusher carriages 186 and 187 are moved inwardly with the alignment carriages 156 and 157 by the screws 167 and 172. The precise placement of the entry carriages 156 and 157 is assured by the positive mechanical nature of the drives 58 and 181.

The clamp 216 of the pusher carriage 187 is thereafter closed on hte strip I, the strip I preferably then being released by the pinch rolls 226 to allow transverse adjustment thereof. The clamp 216 holds the incoming strip I and prevents its falling back rearwardly upon release of the pinch rolls. The pressure fluid cylinders 211 and 211A of the pusher carriages 186 and 187 are not operated to further move the abutment plate 209 and clamp 216 inwardly for firmly urging the drive said edge of the incoming strip I against the abutment plates 162 of the now stationary alignment carriages 156 and 157. Thus, the drive side of the incoming strip I is aligned with the drive side edge of the outgoing strip O.

Because the abutment plates 162 are relatively widely spaced, highly precise alignment of the drive side edge of the incoming strip I in parallelism with the control axis of the apparatus 10 will be insured.

Thereafter, the entry clamp is closed. The clamp 216 is then released and cylinders 211 and 211A are reversed. Subsequently, as discussed further in the afore-mentioned application Ser. No. 553,971, the entry clamp 28 and strip I are moved somewhat away from the O-frame 17. The incoming strip is then trimmed and moved back toward the O-frame sufficiently as to overlap the outgoing strip for welding. The O-frame 17 is then advanced toward the operator side of the machine 13 to move the welding roll 23 across the overlapped joint J of the strips. As above discussed, the limit switch 121, controlling the movement of the welding rolls 23 into gripping contact with the strip, moves with the advancing O-frame 17 and is actuated by the block 118 at a precisely determined point so that the welding rolls come together precisely at the drive side edge of the joint J, continued translation of the O-frame moving the welding rolls along the joint so that welding of the joint J occurs. The limit switch 121 is tripped by the block 119 at the proper point thereafter for separating the welding rolls at the end of the joint J. Thereafter, the direction of the O-frame 17 is reversed, the limit switch 122 being actuated by the block 119 at a precisely predetermined point as it moves therepast so that the planishing rolls 22 are moved toward each other and into contact with the joint J at precisely the operator end thereof, continued motion of the O-frame 17 toward the drive side of the apparatus moving the planishing rolls 22 along the joint J to reduce the thickness thereof substantially to the normal thickness of the strips I and O. The limit switch 122 strikes the actuator block 118 at a precisely determined position of the O-frame 17 and causes the planishing rolls 22 to lift precisely at the drive end of the joint J thus producing the finished weld joint. The control of the vertical movement of the rolls 22 and 23 by the limit switches 121 and 122 may be carried out by the convenient means well known in the art, not here shown.

Upon completion of the weld, the entry and exit clamps 28 and 29 are opened and the outgoing strip O, with the incoming strip I attached to the end thereof, is moved rightwardly out of the machine 13 by any convenient means, not shown. As the joint J approaches the scarfing blocks 83 and 83A, the closest one of the blades 91 and 91A contacts the outermost portion of the weld flash F (FIGURE 5) of the joint J and shears such outermost portion off. The joint J then passes the second blade 91 which shears off a further portion of the flash F and finally passes the last blade 91 which shears off the remaining portion of the flash F so that the edges of the strip at the joint J is even with the rest of such edges. After the joint J is past the scarfing blocks 83 and 83A, the motors 74 and 63 are energized in reverse to retract the carriages 41, 42, 156, 157, 186 and 187 through a short distance, such as a few inches, away from the edges of the strip which may now move rapidly through the apparatus 10 and machine 13. This returns the apparatus 10 to its rest position ready for another operation cycle when required.

MODIFICATION

Modified entry equipment 251 of FIGURE 11 differs from the entry equipment 11 of FIGURE 1 in that the operator side carriages 186 and 187, the drive side way sets 154 and 147 and the operator side halves of the screws 167 and 172 are deleted. Instead, modified positioning apparatus 252 is provided on the drive side of the entry equipment 251 between the existing alignment carriages 156 and 157. The positioning device 252 includes ways 143B and 144B preferably identical to the ways 143 and 144 and a screw 172B preferably identical to the screw 172 above described. The device 252 further includes a carriage 187B supporting a clamp 216B opening toward the strip O, such being preferably identical to the clamp carriage 187 and clamp 216 of FIGURE 1. The screw 172A is driven from the middle of the shaft 176 by a suitable right angle drive 253 so that the positioning carriage 187B moves inwardly toward the drive side of the strip I with the carriages 157 and 156. The modified positioning device 252 differs in its operation from the pusher carriages 186 and 187 replaced thereby in that after the alignment carriages 156 and 157 with carriage 187B reach their inwardmost positions, the clamp cylinder 222B is energized to close the clamp 216B thus gripping the incoming strip I. Thereafter, the traversing cylinder 211B shown in broken lines in FIGURE 11 is energized to move the clamp 216B back toward the drive side of the apparatus, the closed clamp 261B thus pulling the incoming strip I transversely into contact with the abutment plates 162 of the alignment carriages 156 and 157. The operation of the modified apparatus is otherwise generally similar to that described above with respect to the apparatus 10.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a strip positioning and trimming apparatus of a strip end welding machine for welding an incoming strip to an outgoing strip, the combination comprising:
   gauging means on one side of said machine energizable for locating the position of at least one edge of the outgoing strip and providing a signal indicative of said position;
   alignment means on the other side of said machine energizable in response to said signal for movement transversely of the longitudinal path of the incoming strip, said alignment means including an abutment means for at least one edge of the incoming strip in order to align same with said outgoing strip;
   position means on said other side of said machine, said positioning means including power-operated, force-applying means supported for movement transversely of said incoming strip and energizable in sequence with the operation of said alignment means for moving said one edge of said incoming strip transversely against said abutment means to thereby align said one edge of said outgoing strip with said one edge of said incoming strip.

2. In a strip positioning and trimming apparatus of a strip end welding machine, the combination combining:
   gauging means on one side of said machine energizable for gauging the location of one of a pair of strips to be welded together, said one strip extending past said gauging means outwardly from one side of said machine;
   alignment means on the other side of said machine responsive to the positioning of said gauging means for limiting the transverse movement of at least one edge of the other of said pair of strips extending from said other side of said machine;
   positioning means on said otherside of said machine actuatable for gripping said other strip to prevent axial movement thereof and further actuatable for moving said other strip transversely against said alignment means; and
   scarfing means located adjacent said gauging means for shearing irregularities from the edge of said strips.

3. In a strip positioning and trimming apparatus of a strip end welding machine for welding an incoming strip to an outgoing strip, the combination comprising:
   movable gauging means on one side of said machine energizable for movement transversely of the longitudinal path of the outgoing strip for locating the position of at least one edge of the outgoing strip;
   alignment means on the other side of said machine energizable for movement transversely of the longitudinal path of the incoming strip, said alignment means being responsive to the positioning of said gauging means for limiting the transverse movement of at least one edge of the incoming strip, said alignment means including an abutment means with said alignment means being alignable with said one edge of said outgoing strip;
   positioning means on said other side of said machine supported for movement transversely of said incoming strip and energizable for gripping said incoming strip to prevent axial movement thereof and further energizable for moving said at least one edge of said incoming strip transversely against said abutment means to thereby align said one edge of said outgoing strip with said one edge of said incoming strip.

4. The device defined in claim 3 including means responsive to the position of said gauging means for controlling the welding of said strips.

5. The device defined in claim 3 in which said gauging means comprises an opposed pair of carriages;
   means for supporting said carriages on opposite sides of the outgoing strip for movement transversely of the outgoing strip;
   exit drive means connected to said carriages and energizable for moving said carriages independently of each other toward each other;
   detector means mounted on each of said carriages responsive to the position thereof with respect to the adjacent edge of the outgoing strip for de-energizing said drive means associated with the corresponding carriage so as to bring such carriage to a stop at a predetermined location with respect to said adjacent edge.

6. The device defined in claim 5 in which said detector means comprises a light source and means holding same in a fixed position with respect to said carriage at a level below that of said outgoing strip and a photocell vertically aligned with and located above said light source above the level of said outgoing strip, the electrical output of said photocell when said outgoing strip is interposed between said source and said photocell for indicating the position of said outgoing strip.

7. The device defined in claim 5 including a scarfing device mounted on each of said carriages at the level of said outgoing strip, said scarfing devices each having a plurality of scarfing blades placed in sequence along the adjacent edge of said outgoing strip, said scarfing blades each having cutting edges located at sequentially decreasing distances in the direction of strip movement from the edge of said outgoing strip, the one of said blades farthest from said machine having a cutting edge barely clearing the adjacent strip edge, said blades sequentially severing portions of weld flash extending transversely from the adjacent strip edge therefrom as said edge is moved therepast.

8. The device defined in claim 5 including an arm extending from each of said carriages toward said machine, the ends of said arms being located above the corresponding edges of said outgoing strip when the carriages are in their inwardmost positions adjacent the edges of said outgoing strip;

means associated with said machine reciprocable across said outgoing strip during welding of said pair of strips;

a pair of actuator blocks affixed to one of said pair of arms and machine associated means and a pair of limit switches fixed to the other of said arm pair and machine associated means, actuation of said switches by said blocks signalling said machine to start and stop welding.

9. The device defined in claim 3 in which said alignment means comprises a pair of alignment carriages spaced longitudinally of said incoming strip on one side thereof;

guide means for supporting said alignment carriages for movement transversely of said incoming strip;

said abutment means being carried by said carriages opposed to said one edge of said strip;

drive means positively connected between said alignment carriages for driving said carriages along said guide means at the same rate of speed and for maintaining said abutment means on said carriage aligned parallel to the direction of longitudinal movement of said incoming strip.

10. The device defined in claim 5, in which said alignment means includes a pair of alignment carriages spaced along said incoming strip on said one side thereof, strip facing abutments on said alignment carriages and guide means supporting said alignment carriages for movement transversely of said incoming strip, said alignment carriages being aligned with one of said exit carriages; and including drive means positively connected to said alignment carriages and to that portion of said exit drive means associated with said one of said exit carriages for driving said alignment carriages and one exit carriage at the same rate and for maintaining said abutment means aligned parallel to the direction of longitudinal movement of said incoming strip so that said abutment means on said alignment carriages are aligned with the corresponding edge of said outgoing strip when said one of said exit carriages is moved into contact with said corresponding edge.

11. The device defined in claim 3 in which said positioning means comprises at least one positioning carriage:

means guiding said carriage for reciprocation transversely of said incoming strip;

means for driving said carriage transversely toward and away from said incoming strip;

clamp means on at least one of said positioning carriages for gripping said incoming strip to prevent longitudinal movement thereof and for urging same against said alignment means.

12. The device defined in claim 10 in which said positioning means comprises at least one positioning carriage:

means guiding said carriage for reciprocation transversely of said strip;

means for driving said carriage transversely toward and away from said strip;

clamp means on at least one of said positioning carriages for gripping said incoming strip to prevent longitudinal movement thereof and for urging same against said alignment means.

13. The device defined in claim 12, in which said positioning carriage is disposed on the same side of said incoming strip as said alignment carriages and is located therebetween; and said clamp means is movable with respect to said positioning carriage in a direction transverse to said incoming strip.

14. The device defined in claim 12, in which there is at least a pair of positioning carriages, said positioning carriages being disposed on the opposite side of said incoming strip from said alignment carriages and being transversely opposed to said alignment carriages, the one of said positioning carriages closest to said machine including said clamp means and means for moving said clamp means with respect to said one positioning carriage in a direction transverse to said incoming strip, the other of said positioning carriages carrying a positioning abutment movable thereon and means for moving same in a direction toward and away from the opposed one of said alignment carriages, said positioning abutment being opposed to the adjacent edge of said incoming strip, whereby said positioning abutment and clamp means are arranged to urge said incoming strip transversely against the abutment means on said alignment carriages to align said incoming strip with said outgoing strip.

15. The device defined in claim 14, in which the alignment carriage drive means also positively drive the said positioning carriages so that opposed ones of said alignment and positioning carriages move alternatively toward and away from each other.

16. The device defined in claim 13 in which said drive means for said positioning carriage is positively driven in synchronism with said alignment carriage drive means so that said alignment carriages and said positioning carriage move together at the same rate and in the same direction.

17. The device defined in claim 14 in which said means for moving said clamp means and positioning abutment on said positioning carriages comprise pressure fluid cylinders arranged for resiliently urging said clamp means and positioning abutment against said incoming strip.

References Cited

UNITED STATES PATENTS

| | | | |
|---|---|---|---|
| 2,800,568 | 7/1957 | Cooper | 219—82 |
| 2,827,809 | 3/1958 | Beam | 226—19 X |
| 3,057,056 | 10/1962 | Foley et al. | 228—4 X |
| 3,247,354 | 4/1966 | Mallett et al. | 219—82 |
| 3,256,419 | 6/1966 | Taylor et al. | 219—82 X |
| 3,355,077 | 11/1967 | Woodward | 228—5 |
| 3,370,771 | 2/1968 | Shay | 226—18 X |

JOSEPH V. TRUHE, Primary Examiner

B. A. STEIN, Assistant Examiner

U.S. Cl. X.R.

226—20; 228—4